(12) United States Patent
Gabaldon et al.

(10) Patent No.: US 12,135,543 B2
(45) Date of Patent: Nov. 5, 2024

(54) SYSTEM AND METHOD FOR AUTOMATED FAILURE MODE DETECTION OF ROTATING MACHINERY

(71) Applicant: Accenture Global Solutions Limited, Dublin (IE)

(72) Inventors: Jesus Gabaldon, Vic (ES); Robert Gimeno Feu, Barcelona (ES); Jaime Rodríguez Lagunas, Barcelona (ES); Jose Francisco Velasco Cerpa, Madrid (ES); Paula Romero Lopes, Barcelona (ES)

(73) Assignee: Accenture Global Solutions Limited, Dublin (IE)

( * ) Notice: Subject to any disclaimer, the term of this patent is extended or adjusted under 35 U.S.C. 154(b) by 604 days.

(21) Appl. No.: 17/218,126

(22) Filed: Mar. 30, 2021

(65) Prior Publication Data
US 2022/0260985 A1 Aug. 18, 2022

(30) Foreign Application Priority Data
Feb. 12, 2021 (EP) .................................. 21382112

(51) Int. Cl.
*G05B 23/02* (2006.01)
*G01N 29/42* (2006.01)
(Continued)

(52) U.S. Cl.
CPC .......... *G05B 23/027* (2013.01); *G01N 29/42* (2013.01); *G01N 29/4472* (2013.01); *G01N 29/46* (2013.01); *G08B 21/187* (2013.01)

(58) Field of Classification Search
CPC .. G05B 23/027; G01N 29/42; G01N 29/4472; G01N 29/46; G08B 21/187;
(Continued)

(56) References Cited

U.S. PATENT DOCUMENTS

| 2011/0290024 A1* | 12/2011 | Lefler | G01H 1/003 |
| | | | 73/579 |
| 2013/0013138 A1* | 1/2013 | Lu | B60L 3/0061 |
| | | | 702/34 |

(Continued)

OTHER PUBLICATIONS

Zusman, G. "Piezoelectric Vs. MEMs: Future of the Vibration Sensors," Society for Machinery Failure Prevention Technology (MFPT) 2019 Conference, May 14-16, 2019, Philadelphia/King of Prussia, PA.

(Continued)

*Primary Examiner* — Charles R Kasenge

(57) ABSTRACT

Aspects of the present disclosure provide systems, methods, and computer-readable storage media that support automated failure mode detection for rotating machinery based on vibration analysis. To illustrate, a computing device may receive vibration data from one or more sensors configured to measure vibrations of a rotating machine, such as an engine. The computing device may generate a frequency spectrum based on the vibration data (or receive the frequency spectrum) and compare the frequency spectrum to one or more predetermined frequency models to determine one or more similarity metrics. The one or more predetermined frequency models may each be associated with a respective failure mode of the rotating machine. The computing device may identify a failure mode associated with a predetermined frequency model that corresponds to a similarity metric that satisfies a threshold, and the computing device may output an indication of the identified failure mode.

18 Claims, 4 Drawing Sheets

(51) Int. Cl.
*G01N 29/44* (2006.01)
*G01N 29/46* (2006.01)
*G08B 21/18* (2006.01)

(58) Field of Classification Search
CPC ...... G01H 1/003; G01H 3/06; F05D 2260/80; F05D 2260/83; F01D 21/003; G01M 13/00; G01M 15/00; G01M 7/00
See application file for complete search history.

(56) References Cited

U.S. PATENT DOCUMENTS

| | | | |
|---|---|---|---|
| 2015/0363983 A1* | 12/2015 | Cunnings | G07C 5/0808 |
| | | | 701/29.1 |
| 2018/0284741 A1 | 10/2018 | Cella et al. | |
| 2018/0348303 A1* | 12/2018 | Unnikrishnan | G01H 3/12 |
| 2018/0364132 A1* | 12/2018 | Knaup | G01H 1/003 |
| 2019/0383705 A1* | 12/2019 | Smart | G01H 1/00 |

OTHER PUBLICATIONS

European Patent Office, Communication, Extended European Search Report issued for European Patent Application No. 21382112.7, dated Aug. 5, 2021, 10 pages.

* cited by examiner

SYSTEM AND METHOD FOR AUTOMATED FAILURE MODE DETECTION OF ROTATING MACHINERY

CROSS-REFERENCE TO RELATED APPLICATION

The present application claims the benefit of European Patent Application No. 21382112,7 filed Feb. 12, 2021 and entitled "SYSTEM AND METHOD FOR AUTOMATED FAILURE MODE DETECTION OF ROTATING MACHINERY," the disclosure of which is incorporated by reference herein in its entirety.

TECHNICAL FIELD

The present disclosure relates generally to automated failure mode detection using vibrational analysis, particularly failure mode detection at machinery with rotating component(s).

BACKGROUND

Machines with rotating components are commonly used in industrial, commercial, and personal settings. As non-limiting examples, motors, engines, pumps, compressors, blowers, turbines, generators, and gearboxes are all commonplace at industrial facilities and in both residential and commercial machines. Friction caused by rotation of the rotating components eventually leads to failure. The ability to identify when a rotating component will fail is beneficial from a scheduling perspective. For example, it is beneficial to be able to perform maintenance or to schedule maintenance at effective times, such as during a time period where an output target can be achieved with the reduced availability of a particular machine due to maintenance. Additionally, the ability to identify the cause of a predicted machine failure is beneficial. For example, it may not be necessary to replace every rotating component of a machine when only a single rotating component of the machine is near the end of its operational life. As another example, it may not be necessary to replace any component of the machine when a predicted failure is due to an assembly issue, such as shaft misalignment.

Conventional methods of failure detection involve gathering vibration data corresponding to a machine and converting the vibration data to a frequency spectrum. A technician or engineer familiar with the history of a particular machine may be able to evaluate the frequency spectrum to identify when the machine is generating rotational energy that is atypical for normal operation. If the technician or engineer is also an expert in vibrational analysis, they may be able to identify a type of failure that is likely to occur at the machine. Thus, conventional methods of failure detection typically require experienced engineers, which are expensive and less common in today's working environment. Additionally, to detect failure modes at a machine, the engineer or a computer typically analyzes one or more narrow frequency windows in a frequency spectrum. When only a narrow frequency window is considered, some of the rotational energy generated by the machine at other frequencies is ignored, or rotational energy that is not detected at a target frequency but is within the frequency window is considered for failure detection. Thus, the accuracy of conventional failure detection techniques may be limited.

SUMMARY

Aspects of the present disclosure provide systems, methods, apparatus, and computer-readable storage media that support automated detection of failure modes at rotating machinery. The techniques of the present disclosure may enable fast and accurate failure mode detection using vibration analysis. In some aspects, a system of the present disclosure may use vibration data from a sensor monitoring a machine (also referred to as a piece of machinery) to generate a frequency spectrum. The frequency spectrum may be compared to predetermined frequency model(s) that are associated with (e.g., precursors to or indicative of) failure modes) at the machine. The predetermined frequency models may be generated based on analysis of vibration data, in the frequency domain, during failure modes at the machine (or multiple machines of the same machine type, such as engines, motors, pumps, or the like), and comparisons of the generated frequency spectrum to the predetermined frequency models may be used to determine similarity metrics, such as scores. By determining similarity metrics based on differences between the frequency spectrum and the predetermined frequency models, the system described herein may accurately detect failure modes at the machine without user input.

In some aspects, a computing device may determine a condition of a machine (e.g., detect a failure mode) based on vibration data and one or more predetermined frequency models that correspond to various failure modes. In some implementations, the machine may include a rotating component or rotating components, and the condition of the machine may correspond to when the machine will fail or how the machine will fail (e.g., the failure mode). The vibration data may be gathered externally with respect to the computing device. For example, the vibration data may be measured via a sensor coupled to the machine, and the sensor may transmit the measured vibration data to the computing device. The measured vibration data received by the computing device may be converted to a frequency domain (e.g., frequency spectrum) and compared to predetermined frequency models) stored at or accessible to the computing device. Alternatively, the computing device may receive the frequency spectrum from a source, instead of receiving vibration data in the time domain and converting to the frequency domain. The predetermined frequency models may correspond to frequency spectra derived from experimental or historical data, and each predetermined frequency model may be associated with a respective condition (e.g., normal operating condition or one or more failure modes). For example, a frequency model may include amplitude peaks at various frequencies that correspond to a particular failure mode. In some implementations, the predetermined frequency models may correspond to a specific machine (e.g., may be machine specific). As a non-limiting example, one of the predetermined frequency models may correspond to a particular motor with a defined output power, shaft size, and bearing ball size. Alternatively, the predetermined frequency models may be machine agnostic (e.g., may correspond to all machines of a particular type) and may be modified to account for specific characteristics of a particular machine based on measurements and parameters associated with the particular machine.

In some implementations, the comparison of the frequency spectrum to the one or more predetermined frequency models may be used to determine a similarity metric (e.g., a similarity score). The similarity metric may be based on a difference between one or more amplitude values of the frequency spectrum and one or more corresponding amplitude values of the predetermined frequency models. The comparison of the frequency spectrum to the predetermined frequency models may include an evaluation of the entire frequency range associated with the predetermined frequency model, which captures more relevant information than analyzing only a narrow frequency window surrounding an amplitude peak in the frequency spectrum. The computing device may compare similarity metrics (or other measurements or derived values) corresponding to each predetermined frequency model to a threshold stored by or accessible to the computing device. Based on a similarity metric corresponding to a predetermined frequency model satisfying a threshold, the computing device may identify that a condition of the machine corresponds to a condition represented by the predetermined frequency model, such as a normal operating condition or a failure mode. Based on identification of a failure mode, the computing device may output an indication of a predicted failure timeline, a predicted failure mode, or a combination thereof. In some implementations, the output may include an alert or a command to perform a maintenance action at the machine.

The present disclosure describes systems, methods, apparatus, and computer-readable media that provide benefits compared to conventional failure detection systems. For example, the systems described herein may have improved accuracy of predicted failure timelines and failure types due to comparing the frequency spectrum to the predetermined frequency models over an entire frequency range. Conventional failure detection may have reduced accuracy due to analyzing a narrow frequency window surrounding an amplitude peak. In contrast, the techniques described herein compare a frequency spectrum to an entirety of a predetermined model, which improves the accuracy of the failure mode detection. Additionally, the systems and methods of the present disclosure provide automated, real time failure mode detection to improve maintenance scheduling. For example, unexpected downtime of a machine used for product production may lead to unfulfilled orders due to an unexpected inability to make enough product. The automated, real time failure mode detection can eliminate unexpected downtime based on early and accurate predictions of rotating component failures within a machine, which may be useful in mitigating or preventing the failures through maintenance or replacement. As another example, identifying a specific failure mode may enable targeted maintenance to be performed, as compared to expensive and time consuming overhaul of the machine to address multiple potential problems.

In a particular aspect, a method for detecting failure modes of machinery includes obtaining, by one or more processors, a frequency spectrum associated with vibrations of a rotating machine. The method includes determining, by the one or more processors, one or more similarity metrics based on comparing the frequency spectrum to one or more predetermined frequency models. Each of the one or more predetermined frequency models is associated with a respective failure mode. The method also includes identifying, by the one or more processors, a failure mode associated with a predetermined frequency model corresponding to a similarity metric that satisfies a threshold. The method further includes outputting, by the one or more processors, an indication of the identified failure mode.

In another particular aspect, a device for detecting failure modes of machinery includes a memory and one or more processors communicatively coupled to the memory. The one or more processors are configured to obtain a frequency spectrum associated with vibrations of a rotating machine. The one or more processors are configured to determine one or more similarity metrics based on comparing the frequency spectrum to one or more predetermined frequency models. Each of the one or more predetermined frequency models is associated with a respective failure mode. The one or more processors are also configured to identify a failure mode associated with a predetermined frequency model corresponding to a similarity metric that satisfies a threshold. The one or more processors are further configured to output an indication of the identified failure mode.

In another particular aspect, a non-transitory computer-readable storage medium stores instructions that, when executed by one or more processors, cause the one or more processors to perform operations for detecting failure modes of machinery. The operations include obtaining a frequency spectrum associated with vibrations of a rotating machine, The operations include determining one or more similarity metrics based on comparing the frequency spectrum to one or more predetermined frequency models. Each of the one or more predetermined frequency models is associated with a respective failure mode. The operations also include identifying a failure mode associated with a predetermined frequency model corresponding to a similarity metric that satisfies a threshold. The operations further include outputting an indication of the identified failure mode.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DE SCRIPTIM

Aspects of the present disclosure provide systems, methods, apparatus, and computer-readable storage media that support automated detection of failure modes at rotating machinery. The techniques of the present disclosure enable fast and accurate detection of failure modes using vibration analysis. A system of the present disclosure may compare a frequency spectrum based on vibration data from a sensor monitoring a machine to predetermined frequency model(s) associated with (e.g., precursors to or indicative of) failure mode(s) at the machine. The comparisons of a frequency spectrum generated based on the vibration data to the predetermined frequency models may be used to determine similarity metrics based on differences between the frequency spectrum and the predetermined frequency models. Based on a similarity metric corresponding to a predetermined frequency model satisfying a threshold, the computing device may identify that a condition of the machine corresponds to a condition represented by the predetermined frequency model, such as a normal operating condition or a failure mode. The systems described herein may improve accuracy of detected failure modes by comparing the frequency spectrum to the predetermined frequency models over an entire measured frequency range. Due to the improved accuracy of failure mode detection, the systems and methods of the present disclosure provide automated, real time failure mode detection for improving maintenance scheduling. For example, the automated, real time failure mode detection can eliminate unexpected downtime and enable targeted maintenance plans due to early and accurate predictions of rotating component failures within a machine.

Figure 1:
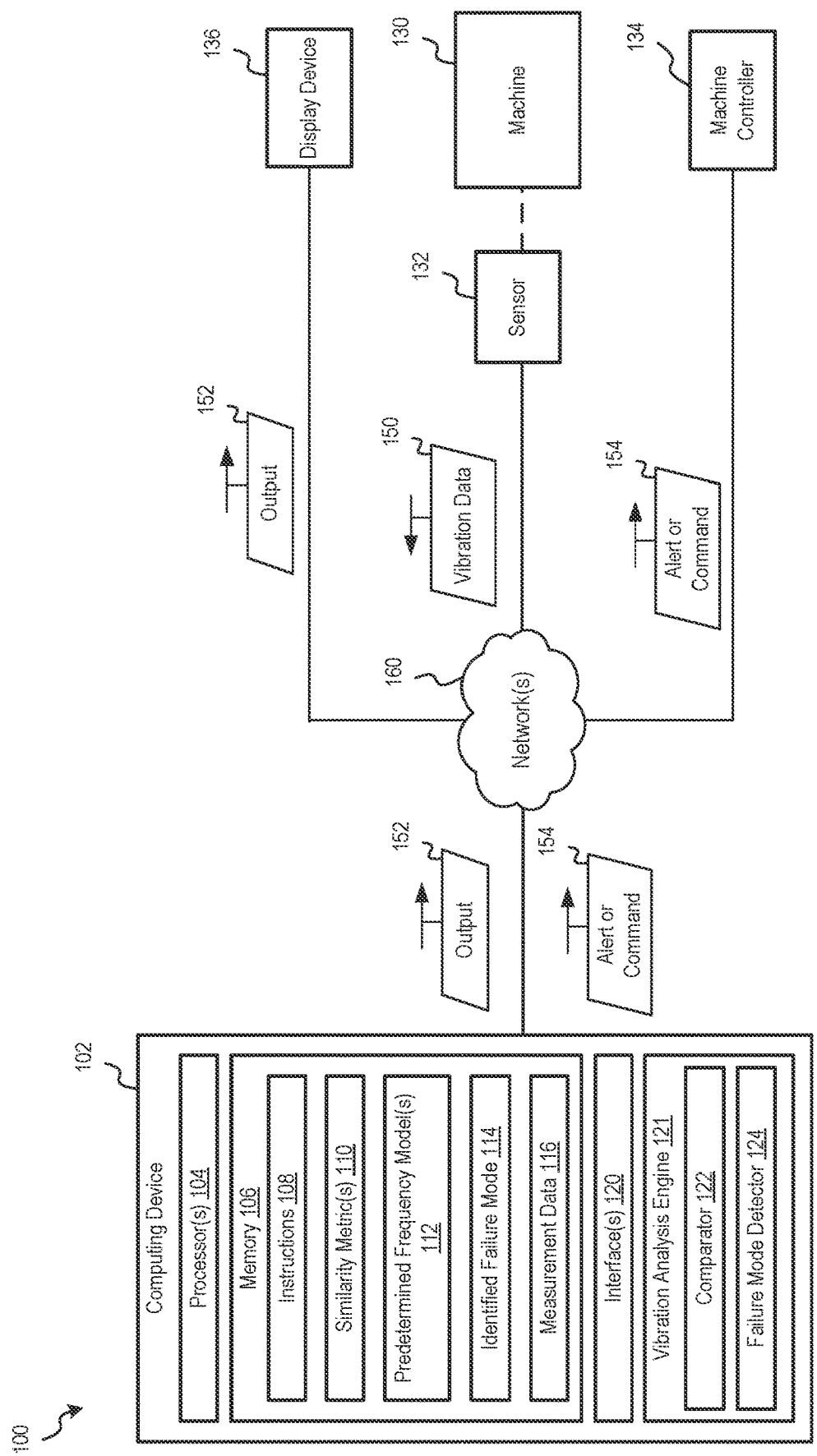
FIG. 1 is a block diagram of an example of a system that supports detecting failure modes of machinery according to one or more aspects.

Referring to FIG. 1, an example of a system that supports detecting failure modes of machinery according to one or more aspects is shown as a system 100. The system 100 may be configured to detect failure modes for rotational machinery (e.g., machinery that includes rotating component(s)) by comparing frequency-domain transformed vibration data to stored frequency models (e.g., spectra) that correspond to different failure modes. The stored frequency models may be generated by an engineer that studies correlations between frequency spectra and failure modes or by the system 100 through analysis of frequency spectra that correspond to failure modes and to normal operation. As shown in FIG. 1, the system 100 includes a computing device 102, a machine 130, one or more sensors 132, a machine controller 134, and a display device 136, and one or more networks 160. In some implementations, one or more of the display device 136 or the machine controller 134 may be optional, or the system 100 may include additional components.

The computing device 102. (e.g., an electronic device or a monitoring station) may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof as non-limiting; examples. The computing device 102 includes one or more processors 104, a memory 106, one or more communication interfaces 120, and a vibration analysis engine 121. The vibration analysis engine 121 may include a comparator 122 and a failure mode detector 124, In some other implementations, one or more additional components may be included in the computing device 102. It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 160, To illustrate, one or more operations described herein with reference to the computing device 102 may be performed by one or more servers or a cloud-based system that communicates with one or more control systems or user devices.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store data and information, such as one or more similarity metrics 110 (referred to herein as "the similarity metrics 110"), one or more predetermined frequency models 112 (referred to herein as "the predetermined frequency models 112"), an identified failure mode 114, and measurement data 116. Illustrative aspects of the predetermined frequency models 112, the similarity metrics 110, the identified failure mode 114, and the measurement data 116 are described in more detail below.

The one or more communication interfaces 120 may be configured to communicatively couple the computing device 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, Bluetooth, Zigbee, and the like). In some implementations, the computing device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to the display device 136, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device 136 is included in or integrated in the computing device 102.

The vibration analysis engine 121 is configured to receive vibration data from the sensors 132 and to convert the vibration data to a frequency domain and use the converted vibration data to detect a failure mode at the machine 130. In some implementations, one or more operations described as being performed by the vibration analysis engine 121 may be performed by the comparator 122 or the failure mode detector 124. To illustrate, the vibration analysis engine 121 may be configured to generate a frequency spectrum, as further described with reference to FIG. 3, based on the vibration data. Generating the frequency spectrum may include converting the vibration data from the time domain to the frequency domain and pre-processing, such as modifying format or units of the vibration data, integrating vibration data from multiple sensors, aggregating the vibration data, and the like. In some implementations, the vibration analysis engine 121 may be configured to perform fast Fourier transform (FFT) on the vibration data to convert the vibration data from the time domain to the frequency domain, and to optionally perform spectrum averaging on the vibration data in the frequency domain (and/or perform averaging on the vibration data in the time domain prior to performing the FFT) to generate a respective frequency spectrum. The frequency spectrum may be generated for an entire measured frequency range, as further described herein, as compared to generating the frequency spectrum or a partial spectrum for one or more windows that span a smaller range that the entire measured frequency range.

The comparator 122 is configured to compare the frequency spectrum generated by the vibration analysis engine 121 to the one or more predetermined frequency models 112. The one or more predetermined frequency models 112 may include or correspond to frequency spectra generated by or stored at the computing device 102 that are each associated with a respective failure mode of the machine 130, as further described herein. For example, the one or more predetermined frequency models 112 may be one or more frequency spectra, frequency-domain vibration data indicative of one or more frequency spectra, or a combination thereof, that are expected to occur (e.g., expected to be measured) during a respective failure mode. Comparing the frequency spectrum to one of the predetermined frequency models 112 may include comparing one or more amplitude values of the frequency spectrum (or the frequency-domain vibration data) to one or more corresponding amplitude values of the predetermined frequency model. To illustrate, the comparator 122 may be configured to compare an amplitude of the frequency spectrum at a particular frequency associated with an amplitude peak in the frequency model to the amplitude peak. Additionally, or alternatively, sums of amplitudes, averages of amplitudes, or the like, may be compared to corresponding values from the predetermined frequency models 112. Difference between the amplitudes (or values based on the amplitudes) of the frequency spectrum and each of the predetermined frequency models 112 may be used to determine the similarity metrics 110. The similarity metrics 110 may include similarity scores, other similarity metrics, other values generated based on or derived from the frequency spectrum and the predetermined frequency models 112, or a combination thereof. For example, the similarity metrics 110 may include a difference between two amplitude values, a difference between sums of amplitudes, a difference between average of amplitudes, weighted versions thereof, or the like. As an illustrative example, for a failure mode associated with three particular frequencies of interest, a similarity metric may be calculated based on an average of the difference between amplitude values of the frequency spectrum and a predetermined frequency model at the three frequencies of interest. As another illustrative example, for this failure mode, a similarity metric may be calculated based on a weighted sum of the difference between amplitude values of the frequency spectrum and a predetermined frequency model at the three frequencies of interest, where each amplitude difference has a different respective weight based on the overall contribution of vibrations at the respective frequency to occurrence of the failure mode.

The failure mode detector 124 is configured to identify a failure mode (e.g., the identified failure mode 114) based on the similarity metrics 110. To illustrate, the failure mode detector 124 may be configured to compare each of the similarity metrics 110 to a threshold, and for any similarity value that satisfies (e.g., is greater than, or greater than or equal to) the threshold, identify the predetermined frequency model that corresponds to the identified similarity values. lure modes associated with these identified predetermined frequency values may be selected as the identified failure mode 114, which may include a single failure mode if only a single similarity metric satisfies the threshold, or multiple failure modes if multiple similarity metrics satisfy the threshold. For example, if the predetermined frequency models 112 include a first model and a second model, and the similarity metric that corresponds to the second model satisfies the threshold, a particular failure mode associated with the second model is identified as the identified failure mode 114.

The machine 130 may include or correspond to industrial machinery or any type of machine asset that is a rotating machine. As used herein, a "rotating machine" refers to any type of machine that includes at least one component that rotates during operation of the machine. For example, the machine 130 may include or correspond to a motor, a pump, a gearbox, or an engine, as non-limiting examples. The sensors 132 may include one or more sensors that are coupled to or otherwise positioned to measure vibrations and other measurements, such as temperature, power consumption, position, or the like. In some implementations, the sensors 132 include at least one accelerometer coupled to the machine 130. The accelerometer may include a piezoelectric accelerometer or a microelectromechanical (MEM) accelerometer, as non-limiting examples. In some other implementations, the sensors 132 may include laser sensors. In some implementations, the sensors 132 may be Internet of Things (IoT) devices. The sensors 132 may be configured to measure vibrations of a rotating component of the machine 130. In some implementations, the sensors 132 may be communicatively coupled to the one or more networks 160 to enable transmission of various measurement data, such as vibration data, to the computing device 102. In some implementations, the sensors 132 may be positioned in an x, y, or z orientation on or near the machine 130 (or the rotating component). The sensors 132 may be coupled to the machine 130 (or the rotating component) using any technique, such as via screws, adhesive, or magnets, as non-limiting examples.

The machine controller 134 may include or correspond to a controller or control system for automated, or semi-automated, control of the machine 130. For example, the machine controller 134 may include a processor and a memory, and the processor may execute instructions stored at the memory to perform the operations described herein, in addition to one or more motors, actuators, or other components to enable performance of operations. The machine controller 134 may initiate or control performance of one or more operations at, or one or more aspects of, the machine 130. For example, the machine controller 134 may be configured to initiate operation of the machine 130, terminate operation of the machine 130, control a speed or amount of power provided to the machine 130, initiate repair or reconfiguration of the machine 130, other operations, or a combination thereof. Although shown in FIG. 1 as external to the machine 130, in some other implementations, the machine controller 134 may be included or integrated within the machine 130.

The display device 136 may be configured to display text, images, video content, multimedia content, AR content, VR. content, XR content, or the like, related to monitoring of the machine 130. As described above, the display device 136 may be external to the computing device 102. For example, the display device 136 may be included in a monitoring station or platform associated with the machine 130. Alternatively, the display device 136 may be included or integrated within the computing device 102.

During operation of the system 100, the sensors 132 may monitor the machine 130 (or one or more components thereof) to measure vibrations and generate vibration data 150. The vibration data 150 may indicate vibration measurements over time (e.g., in the time domain). In some implementations, the sensors 132 may be configured to measure and generate additional sensor data with the vibration data 150. The sensors 132 may provide the vibration data 150 to the computing device 102, such as via the one or more networks 160.

Figure 3:
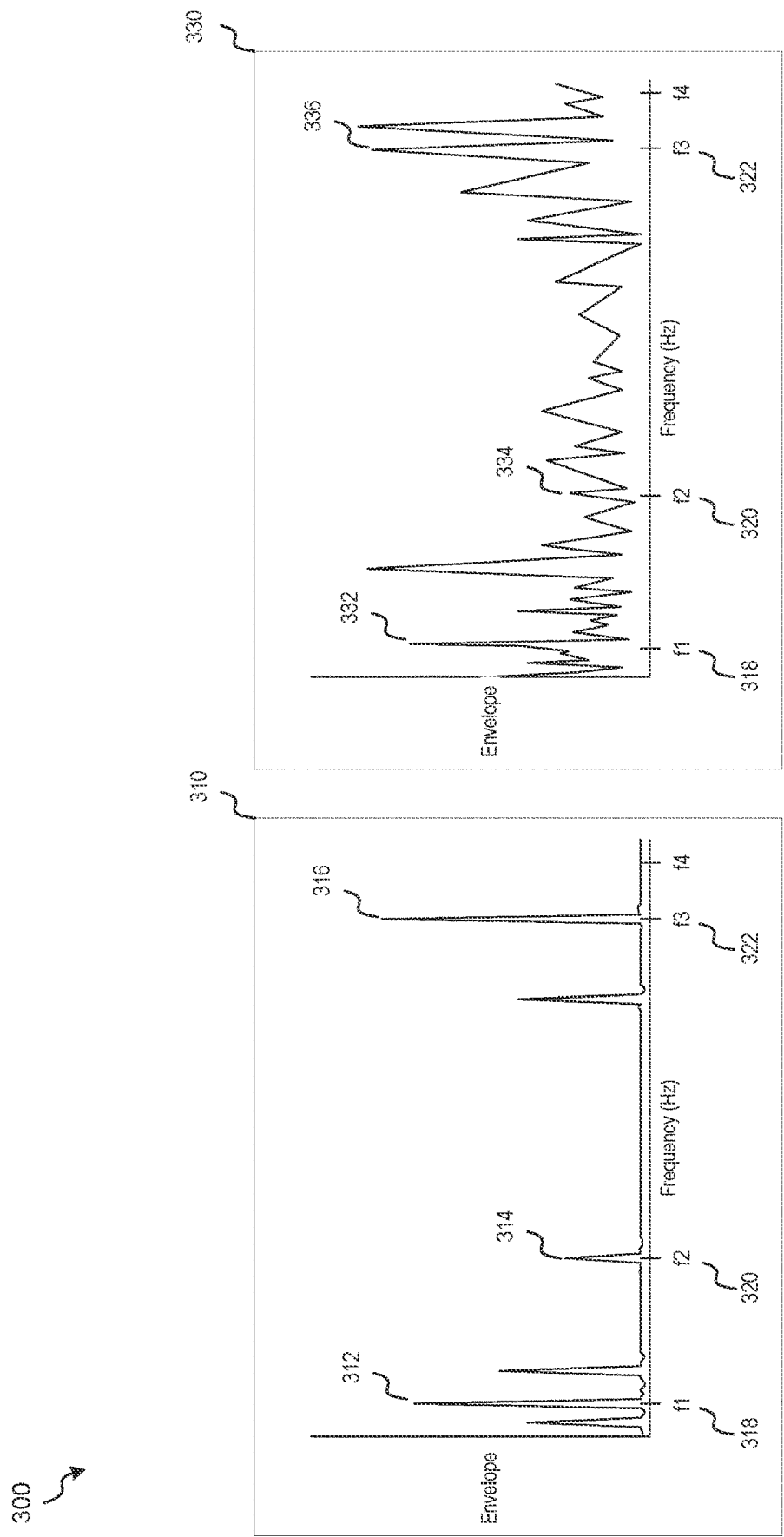
FIG. 3 shows an example of a frequency spectrum based on vibration data and an example of a predetermined frequency model according to one or more aspects.

The computing device 102 may receive the vibration data 150 from the sensors 132. and may generate a frequency spectrum based on the vibration data 150. For example, the vibration analysis engine 121 may convert the vibration data 150 from the time domain to the frequency domain to generate the frequency spectrum. An illustrative frequency spectrum is shown in FIG. 3. In some implementations, generating the frequency spectrum includes pre-processing the vibration data 150, performing averaging on the vibration data 150, performing FFT on the vibration data 150, performing spectrum averaging (also referred to as spectral averaging) on the vibration data 150 in the frequency domain, or a combination thereof. In some implementations, converting the vibration data 150 to the frequency domain may result in spectra in multiple different channels, and the spectra for the multiple channels may be combined (e.g., averaged) using the spectrum averaging. In some other implementations, the computing device 102 may receive the frequency spectrum, which may be generated by a different device.

After generating the frequency spectrum, the comparator 122 may determine the similarity metrics 110 based on the frequency spectrum and the predetermined frequency models 112. The predetermined frequency models 112 include pre-generated frequency spectra (or data representative thereof) that correspond to potential failure modes of the machine 130. For example, the pre-generated (e,g., predetermined) frequency spectra may include spectra of amplitude (e.g., vibration strength) across a measured frequency range that are expected during occurrence of, or as a precursor to, various failure modes of the machine 130. The predetermined frequency models 112 may be generated based on user input or based on automated analysis of the machine 130 (or similar machines). For example, an engineer may input information representing one or more known frequency spectra associated with one or more failure modes, or the computing device 102 may process historic vibration data during normal operation of the machine 130 and during the one or more failure modes to determine the predetermined frequency models 112. Each of the predetermined frequency models 112 corresponds to a failure mode of the machine 130. In some implementations, each of the predetermined frequency models 112 may correspond to a different respective failure mode. In some other implementations, more than one of the predetermined frequency models 112 may correspond to the same failure mode (e.g., there may be multiple frequency responses that indicate occurrence of a particular failure mode). The failure modes may include any type of known failure that may occur for rotating machines (or rotating components), such as an unbalanced condition, a misalignment, a rolling element bearing fault, looseness, stator eccentricity, rotor eccentricity, broken rotor bars, oil whirl in journal bearings, a hydraulic fault, an aerodynamic fault, a surge, or a combination thereof, as non-limiting examples. As an illustrative example, a particular predetermined frequency model may include or correspond to a frequency spectrum having amplitude peaks at 20 and 40 Hertz (Hz) and may be associated with a bent shaft in a motor.

In some implementations, the computing device 102 (e.g., the vibration analysis engine 121) may select the predetermined frequency models 112 from a group of predetermined frequency models that are associated with multiple different machines (or types of machines). For example, a database (e.g., data source) accessible via the one or more networks 160 (or the memory 106) may store multiple groups of predetermined frequency models, each group of predetermined frequency model associated with a different machine type (or a different particular machine). The predetermined frequency models 112 (e.g., a group of the multiple groups) may be selected based on the predetermined frequency models 112 all being associated with the same machine type as the machine 130. For example, if the machine 130 is an engine, the predetermined frequency models 112 may be the group of predetermined frequency models that correspond to engines. Alternatively, the predetermined frequency models 112 may be specific to the machine 130, and may be selected based on an identifier of the machine 130. Additionally or alternatively, the predetermined frequency models 112 may be selected in another manner, such as based on user input. Using different frequency models for different types of machines may reduce processing resource use at the computing device 102 as compared to using one set of frequency models for all machines.

In some other implementations, the predetermined frequency models 112 are machine type (or machine) agnostic, and may be based on analysis of the particular failure modes across multiple different types of machines. In some such implementations, the computing device 102. (e.g., the vibration analysis engine 121) may modify the predetermined frequency models 112 prior to use in determining the similarity metrics 110. For example, the vibration analysis engine 121 may modify the predetermined frequency models 112 based on measurement data 116 associated with the machine 130 to adapt the predetermined frequency models 112 to the specific operating characteristics of the machine 130. For example, the measurement data 116 may include rotation speed, shaft diameter, bearing diameter, number of bearings, size of tracks, environmental noise, and the like, and the predetermined frequency models 112 may be adjusted based on the measurement data, such as by modifying amplitudes, sniffing particular frequencies, flattening or narrowing curves, or the like, Using one set of frequency models for all types of machines may reduce a memory footprint for frequency models as compared to using a different set of frequency models for each machine type (or each individual machine).

To illustrate determination of the similarity metrics 110, the comparator 122 may compare the frequency spectrum to each of the predetermined frequency models 112. For example, the comparator 122 may compare amplitudes at particular frequencies (e.g., frequency-specific amplitude values) between the frequency spectrum and the predetermined frequency models 112 to determine differences in amplitude between the frequency spectrum and the predetermined frequency models 112. The similarity metrics 110 may be equal to, or based on, the differences, In some implementations, the particular frequencies may be particular measured frequencies for rotating parts, such as a ball spin frequency (BSF), a fundamental train frequency (FTF), a ball pass frequency of an outer ring (BPFO), a ball pass frequency of an inner ring (BPFI), or the like. As one example, the comparator 122 may compare the amplitude of the frequency spectrum at a particular frequency to the amplitude of a first frequency model of the predetermined frequency models 112 at the same frequency to determine a difference, and a first similarity metric of the similarity metrics 110 may be equal to the difference, or a weighted version of the difference. As another example, the comparator 122 may compare a sum of amplitudes of the frequency spectrum at multiple particular frequencies to a sum of amplitudes of the first frequency model at same frequencies to determine a difference, and the first similarity metric may be equal to the difference, or a weighted version of the difference. As another example, the comparator 122 may compare an average (or a median, or a mode) of amplitudes of the frequency spectrum at multiple particular frequencies to an average (or a median, or a mode) of amplitudes of the first frequency model at same frequencies to determine a difference, and the first similarity metric may be equal to the difference, or a weighted version of the difference. Others of the similarity metrics 110 may be determined as described above based on comparisons between the frequency spectrum and the others of the predetermined frequency models 112.

To determine the similarity metrics 110, the comparator 122 may compare the frequency spectrum to the predetermined frequency models 112 over an entirety of a measured frequency range associated with the predetermined frequency models 112. To illustrate, if the predetermined frequency models 112 include relevant data, including multiple amplitude peaks, across a particular frequency range, then the frequency spectrum generated based on the vibration data 150 is generated for an entirety of the particular frequency range, and not just a window (e.g., a portion of the particular frequency range) around an amplitude peak. As a non-limiting example, if a predetermined frequency model includes amplitude peaks at 30 Hz, 60 Hz, and 140 Hz, and substantially null values beyond 160 Hz, then the frequency spectrum may be generated for a frequency range of 0-160 Hz, instead of for a 5 or 10 Hz window around one of the amplitude peaks. Additional examples are described with reference to FIG. 3. Comparing the frequency spectrum and the predetermined frequency models 112 across the entirety of the measured frequency range may improve the accuracy of failure mode detection provided by the system 100, as compared to detecting failures by analyzing a small window around a particular amplitude peak.

After generating similarity metrics 110, the failure mode detector 124 may identify the identified failure mode 114 based on the similarity metrics 110. To illustrate, the failure mode detector 124 may compare each of the similarity metrics 110 to a threshold (not shown) stored at the memory 106. Each similarity metric of the similarity metrics 110 that satisfies the threshold corresponds to a failure mode that is detected based on the frequency spectrum. For example, if the similarity metrics 110 include five similarity metrics that correspond, respectively, to one of five predetermined frequency models and the third similarity metric satisfies the threshold, the failure mode that corresponds to the third predetermined frequency model is identified as the identified failure mode 114. As an illustrative example, if the first predetermined frequency model corresponds to an unbalanced condition, the second predetermined frequency model corresponds to a misalignment condition, the third predetermined frequency model corresponds to a looseness of a rotor, the fourth predetermined frequency model corresponds to stator eccentricity, and the fifth predetermined frequency model corresponds to a broken rotor bar, if the third similarity metric satisfies the threshold, the identified failure mode 114 is looseness of the rotor. Although described as a single identified failure mode 114, multiple failure modes may be identified, if multiple failure triodes are capable of occurring concurrently. In some implementations, identification of the identified failure mode 114 may be performed in real-time/substantially real-time (e.g., accounting for processing needs of the various aspects being utilized). For example, determination of the similarity metrics 110, comparison of the similarity metrics 110 to the threshold, and identification of the identified failure mode 114 may involve relatively few processing operations that are capable of performance for use in real-time/substantially real-time applications, as further described below.

After detecting the identified failure mode 114, the computing device 102. generates an output 152 that indicates the identified failure mode 114. The output 152 may be provided to a user, such as via the display device 136 or a user device, or to another device, such as the machine controller 134. As an example, the output 152 may be provided to the display device 136 to cause display of a graphic user interface (GUI) at the display device 136. The GUI may indicate the identified failure mode 114 and, optionally, additional information. For example, the GUI may include the name of identified failure mode 114, information associated with the identified failure mode 114 (e.g., expected improper performance or the like), a graphical depiction of the frequency spectrum based on the vibration data 150, a graphical depiction of a time domain vibration waveform, a graphical depiction of the particular frequency model of the predetermined frequency models 112 that corresponds to the identified failure mode 114, the similarity metric of the similarity metrics 110 that corresponds to the particular frequency model, the threshold, or a combination thereof.

As another example, the output 152 may include or correspond to an alert or command 154. The alert or command 154 may include an alert that indicates the identified failure mode 114 and an identifier of the machine 130. For example, the alert may include a visual alert, an audio alert, a haptic alert (any of which may be output by the computing device 102 or the display device 136, the machine controller 134, or a user device of a worker at the site of the machine 130) another type of alert, or a combination thereof to indicate that maintenance or stopping of the machine 130 is suggested or required. Additionally or alternatively, the alert or command 154 may include a command to initiate performance of a maintenance action with respect to the machine 130 to mitigate the identified failure mode 114. To illustrate, the alert or command 154 may be provided to the machine controller 134, and the machine controller 134 may initiate performance of the maintenance action at the machine 130. As an illustrative example, the alert or command 154 may include a command to slow a rotation of, or stop, the machine 130, and the machine controller 134 may cause an axel (or other rotating part) of the machine 130 to slow or stop based on the alert or command 154. As another illustrative example, the machine controller 134 may be configured to control one or more robots or robotic components (eg., a robotic arm or the like), and the machine controller 134 may cause the robot or robotic component to replace the machine 130 (or a component thereof) based on receipt of the alert of command 154.

In some implementations, in addition to detecting the identified failure mode 114, the vibration analysis engine 121 may track a particular amplitude peak of the frequency spectrum over time. For example, if, based on a comparison of a particular amplitude peak of the frequency spectrum to the corresponding amplitude peak of one of the predetermined frequency models 112, the associated similarity metric satisfies the threshold, the vibration analysis engine 121 may track the amplitude peak using future vibration data. Tracking the amplitude peak may provide useful information for monitoring or maintaining the machine 130. For example, if the predetermined frequency model corresponds to a precursor state (e.g., a state that occurs before a failure mode), the amplitude peak may be tracked to determine whether the failure mode actually occurs, or whether the precursor state does not lead to the failure mode. As another example, if a maintenance action is performed with respect to the machine 130 based on the comparison indicating a failure mode, the amplitude peak may be tracked to determine if the amplitude decreases after performance of the maintenance action, and the machine 130 exits the failure mode due to the maintenance action.

As described above, the system 100 supports automated failure mode detection for rotating machines using vibration analysis having improved accuracy as compared to conventional, mostly human-based failure detection techniques. For example, the system 100 may identify the identified failure mode 114 by comparing a frequency spectrum based on the vibration data 150 to the predetermined frequency models 112 over an entire frequency range. By using the predetermined frequency models 112 and comparing over the entire frequency range, the identified failure mode 114 is detected with improved accuracy as compared to other failure detection techniques that include using peak detection on frequency domain vibration data. To illustrate, peaks at adjacent frequencies in a frequency spectrum may combine to form a single, wider peak, which results in a larger amount of energy being detected using a peak detector and narrow window, which increases the number of false positive failure mode detections in conventional failure mode detection. Additionally, the system 100 provides automated, real time failure mode detection to improve maintenance scheduling. For example, unexpected downtime of the machine 130 may lead to unfulfilled orders due to an unexpected inability to make enough product using the machine 130. The system 100 may eliminate unexpected downtime based on early and accurate predictions of rotating component failures within the machine 130, which may be useful in mitigating or preventing the failures through maintenance or replacement at the machine 130. Additionally, detecting failure modes based on the vibration data 150 may enable detection of failure modes for interior components of the machine 130, which would otherwise require downtime for removal and manual inspection.

Figure 2:
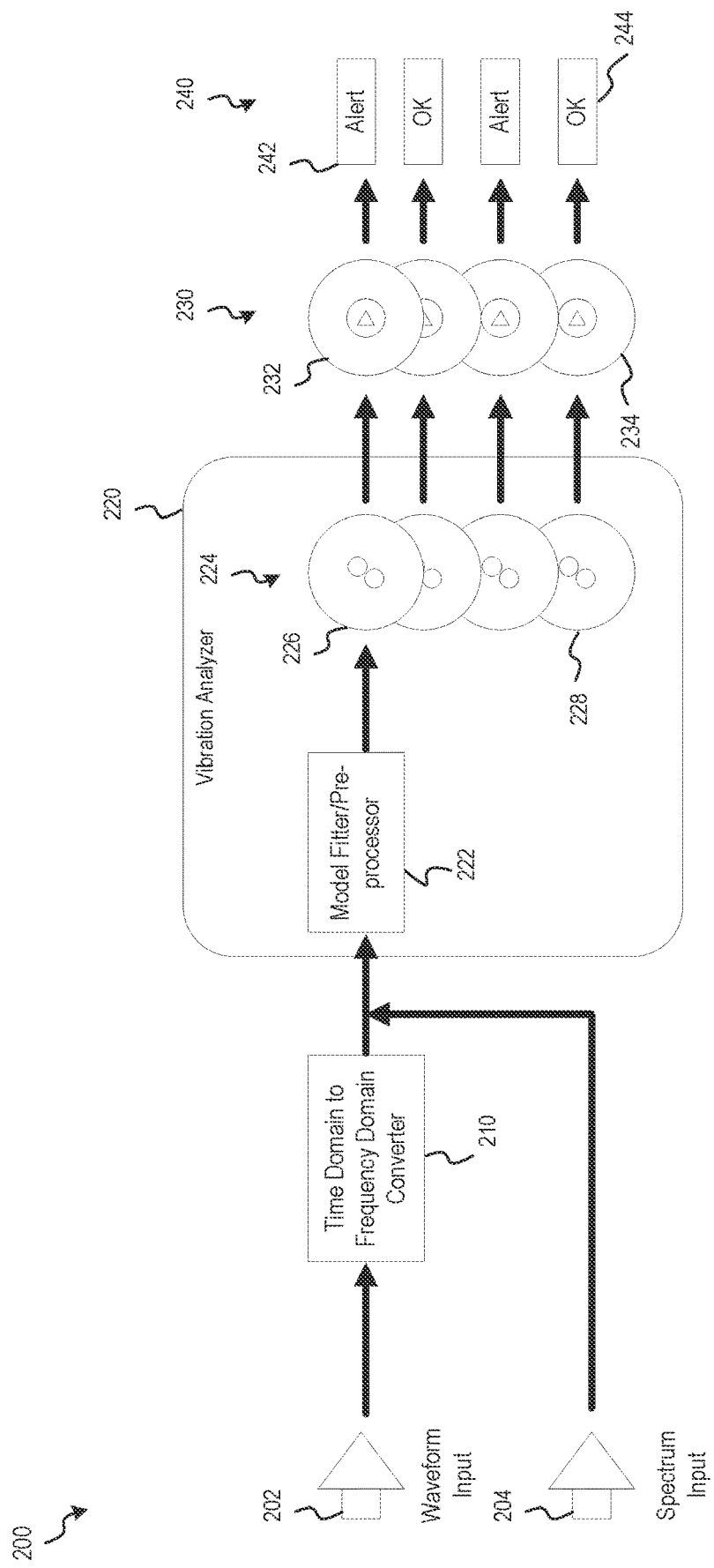
FIG. 2 is a block diagram of an example of a system that supports alert generation based on vibrational analysis according to one or more aspects.

Referring to FIG. 2, an example of a system that supports alert generation based on vibrational analysis according to one or more aspects is shown as a system 200. The system 200 may be configured to generate alerts when failure modes are detected for multiple machinery assets. The machinery assets may include different rotating machines, such as engines, motors, pumps, gearboxes, or the like. In some implementations, the system 200 (or one or more components thereof) may include or correspond to the system 100 (or one or more components thereof) of FIG. 1. As shown in FIG. 2, the system 200 includes a time domain to frequency domain converter 210 (referred to herein as "the converter 210"), a vibration analyzer 220, and multiple status generators 230. The system 200 may receive, as input, vibration data such as a waveform input 202 or a spectrum input 204. The waveform input 202 may include vibration data in the time domain corresponding to the machinery assets. The spectrum input 204 may include vibration data in the frequency domain corresponding to the machinery assets.

The converter 210 may be configured to receive the waveform input 202. The waveform input 202 may be communicated to the converter 210 via one or more networks. In some implementations, the waveform input 202 communicated to the converter 210 may be measured by one or more sensors that each correspond to an axis of a machine. The one or more sensors may be coupled to the machine and configured to gather the waveform input 202 over time. In some implementations, the one or more sensors are coupled to a rotating component of the machine. The waveform input 202 measured by the one or more sensors may be in the time domain and the converter 210 may be configured to convert the waveform input 202 from the time domain to the frequency domain. The converter 210 may perform one or more FFTs on the waveform input 202 to convert the waveform input 202 from the time domain to the frequency domain. In some implementations, the converter 210 may perform spectrum averaging on the waveform input 202 in the frequency domain to generate a respective frequency spectrum, perform averaging on the vibration data in the time domain, or both. The frequency spectrum (e.g., based on the waveform input 202) may be provided to the vibration analyzer 220. Alternatively, the spectrum input 204 may be received from an external source and provided directly to the vibration analyzer 220. The spectrum input 204 may include frequency-domain representations of vibrations, which may be generated or converted by the external source. When the spectrum input 204 is provided, the converter 210 is not needed.

The vibration analyzer 220 may be configured to analyze the frequency domain vibration data in order to determine similarity metrics indicating similarities of the input vibration data to predetermined frequency models. The vibration analyzer 220 includes a model fitter/pre-processor 222 and multiple predetermined frequency models 224. The model fitter/pre-processor 222 may perform pre-processing operations to the waveform input 202. For example, the waveform input 202 may include vibration data from multiple sensors and the model fitter/pre-processor 222 may integrate and aggregate the vibration data from the multiple sensors. As another example, the model fitter/pre-processor 222 may modify the format, the units, or a combination thereof, of the waveform input 202 to match a format and units of the predetermined frequency models 224.

The resultant frequency spectrum may be compared to the predetermined frequency models 224 to generate the similarity metrics (e.g., similarity scores or other metrics). The predetermined frequency models 224 may include vibration data in the frequency domain that corresponds to various operating conditions of a particular machine, such as normal operating condition, one or more failure modes, or a combination thereof. For example, a first predetermined frequency model 226 may correspond to a particular failure mode (e.g., a faulty bearing) of a particular engine and an Nth predetermined frequency model 228 may correspond to a faulty bearing for a particular pump. In some implementations, the predetermined frequency models 224 may be based on industry standard failure modes. Each of the predetermined frequency models 224 may represent a frequency spectrum that includes one or more amplitude peaks at particular frequencies, and these particular frequencies may be different across the predetermined frequency models 224 based on differences between the machines to which each model corresponds (e.g., a particular failure mode may be associated with different frequency models for different machines). For example, the first predetermined frequency model 226 and the Nth predetermined frequency model 228 may each correspond to a faulty bearing; however, the two predetermined frequency models 226, 228 may not be the same (e.g., an amplitude peak of the first predetermined frequency model 226 may be located at a different frequency than the corresponding amplitude peak of the Nth predetermined frequency model 228). In some implementations, the predetermined frequency models 224 may be stored and accessed to compare received vibration data corresponding to a particular machine to the predetermined frequency model corresponding to that particular machine. Although each of the predetermined frequency models 224 are described as corresponding to the same failure mode, the predetermined frequency models 224 may also include frequency models for multiple different failure modes, such that the predetermined frequency models 224 include one or more respective models (for one or more failure modes) for each different machine.

In some implementations, the vibration analyzer 220 may receive, or have pre-stored, the predetermined frequency models 224 that correspond to multiple different machines (and optionally multiple different failure modes). Alternatively, the vibration analyzer 220 may generate the predetermined frequency models 224 based on a single frequency model for the respective failure mode. For example, the single frequency model may be a single model that is machine agnostic (e.g., may correspond to all machines of a particular type) and may be modified to account for specific characteristics of a particular machine (e.g., to generate one of multiple machine-specific frequency models) based on measurements and parameters associated with the particular machine. To illustrate, the vibration analyzer 220 may modify the machine agnostic predetermined frequency model based on machine specific measurements for multiple different machines to generate the predetermined frequency models 224. For example, based on rotation speed, shall diameter, bearing diameter, number of bearings, and the like, for a first machine (e.g., a particular engine), the vibration analyzer 220 may generate the first predetermined frequency model 226 corresponding to the first machine. Frequency models for other machines may be similarly generated based on respective measurements and parameters associated with the other machines. This process may also be referred to as a calibration process (e.g., calibrating the frequency models based on the machines).

Based on the comparison of frequency spectra generated based on the waveform input 202 to the predetermined frequency models 224, the vibration analyzer 220 may determine similarity metrics. Each similarity metric may indicate a similarity between the frequency spectrum and a predetermined frequency model. Similarity metrics may by based on a difference between two amplitude values, a difference between sums of amplitudes, a difference between average of amplitudes, weighted versions thereof, or the like, based on a comparison of the frequency spectrum to the predetermined frequency models 224 over an entire measured frequency range associated with the predetermined frequency models 224. Comparisons over the entire measured frequency range may enable better discrimination between contributions to amplitude of a particular frequency-specific cause and contributions from different harmonics, which may enable more precise comparison of the frequency spectra and the predetermined frequency models 224 than comparisons for only a small frequency window surrounding an amplitude peak. In some implementations, a higher similarity metric indicates a greater degree of similarity between the frequency spectrum and the predetermined frequency model to which the frequency spectrum is compared, which may be indicative of the frequency spectrum being sufficiently similar to a frequency spectrum that represents (or is observed to occur during) a respective failure mode. Additional details of the comparison are described herein with reference to FIG. 3.

The similarity metrics may be provided to the status generators 230, which are configured to output statuses 240 based on the similarity metrics. Each of the status generators 230 may be associated with a particular machine, and the statuses 240 may include alerts, normal operating status notifications, and the like. Each of the status generators 230 may be configured to compare a received similarity metric to a threshold. For any similarity metric that satisfies (e.g., is greater than, or greater than or equal to) the threshold, the status generators 230 may output an alert as the respective status. For example, if the similarity metric provided to a first status generator 232 satisfies the threshold, the first status generator 232 may output an alert 242. As non-limiting examples, the alert 242 may be visual, audio, haptic, or the like. In some implementations, the alert 242 may include an indication of the failure mode corresponding to the alert 242 (e.g., a failure mode associated with the first predetermined frequency model 226). The alert may be used to initiate a mitigation plan, such as performing replacement or maintenance actions, to reduce downtime of the respective machine. As another example, if the similarity metric provided to an Nth status generator 234 does not satisfy the threshold, the Nth status generator 234 may output a normal operating status notification 244 ("OK" in FIG. 2). In some implementations, each of the status generators 230 may compare received similarity metrics to a common threshold. Alternatively, one or more of the status generators 230 may compare received similarity metrics to a machine specific threshold. For example, a particular machine may have a lower threshold than other machines (e.g., an alert is provided based on less vibration) if the particular machine does not have backup, if failure of the particular machine will cause failure of multiple downstream components, if the particular machine is highly sensitive, or for other reasons. Although shown as each status generator outputting a single status, in other implementations, each of the status generators 230 may receive multiple similarity metrics corresponding to multiple failure modes, and each of the status generators 230 may output multiple statuses (e.g., failure mode-specific statuses) or a single status indicating whether any failure mode is detected.

Referring to FIG. 3, examples 300 of a frequency spectrum based on vibration data and a predetermined frequency model according to one or more aspects are shown. The examples 300 include a predetermined frequency model 310 and a frequency spectrum 330. In some implementations, the predetermined frequency model 310 may include or correspond to one of the predetermined frequency models 112 of FIG. 1, and the frequency spectrum 330 may be generated based on the vibration data 150 of FIG. 1.

The predetermined frequency model. 310 shows vibration data in the frequency domain (e.g., an envelope of the vibrations across a measured frequency range) corresponding to a failure mode for a machine. As a non-limiting example, the predetermined frequency model 310 may be a frequency spectrum of vibrations that are known (or measured) to occur as a precursor to, or during, a misalignment of an engine. The predetermined frequency model 310 may include multiple amplitude peaks at particular frequencies, such as a first amplitude value 312 at a first frequency 318 ("f1"), a second amplitude value 314 at a second frequency 320 ("f2"), and a third amplitude value 316 at a third frequency 322 ("f3"). The frequency spectrum 330 shows vibration data in the frequency domain obtained from one or more sensors, such as an accelerometer, configured to measure vibrations from a machine. The vibration data may be obtained in the time domain and converted to the frequency domain, as further described above with reference to FIGS. 1 and 2. The frequency spectrum 33 may include multiple amplitude peaks at particular frequencies, such as a fourth amplitude value 332 at the first frequency 318, a fifth amplitude value 334 at the second frequency 320, and a sixth amplitude value 336 at the third frequency 322.

The predetermined frequency model 310 may correspond to an operating condition of a machine. In some implementations, the predetermined frequency model 310 may be derived from experimental or historical data of the machine. The operating condition may correspond to a normal operating condition or a failure mode, such as a misalignment, an issue with a ball bearing, or the like. For example, the presence of amplitude peaks at the particular frequencies shown in FIG. 3 may correspond to a faulty bearing of a particular engine, Although the predetermined frequency model 310 is described as corresponding to a faulty bearing of a particular engine, in other implementations, the predetermined frequency model 310 may correspond to other machines, including but not limited to a pump or a turbine. Additionally or alternatively, the predetermined frequency model 310 may correspond to other failure modes, including but not limited to misalignment or broken rotor bars.

The frequency spectrum 330 may correspond to measured vibrations of the machine. In some implementations, the frequency spectrum 330 may be based on measurements received from sensors configured to measure vibration of the machine. The amplitude of the frequency spectrum 330 may be compared to the amplitude values of the predetermined frequency model 310 at particular frequencies across an entirety of the measured frequency range associated with the predetermined frequency model 310 (e.g., from 0 to frequency "f4" in the example illustrated in FIG. 3). For example, amplitudes at particular frequencies (e.g., frequency-specific amplitude values) between the predetermined frequency model 310 and the frequency spectrum 330 may be compared to determine differences in amplitude. The comparison of the predetermined frequency model 310 to the frequency spectrum 330 may be at specific frequencies associated with amplitude peaks in the predetermined frequency model 310 over the entirety of a frequency range associated with the predetermined frequency model 310.

A similarity metric may equal to, or based on, the differences from the comparison of the predetermined frequency model 310 to the frequency spectrum 330. For example, the first amplitude value 312 of the predetermined frequency model 310 at the first frequency 318 may be compared to the fourth amplitude value 332 of the frequency spectrum 330 at the first frequency 318 (e.g., at the same frequency). A first similarity metric comparing the predetermined frequency model 310 and the frequency spectrum 330 may be set to a difference between the first amplitude value 312 and the fourth amplitude value 332. For example, the first similarity metric may be calculated based on the formula Ampn (model)−Ampn(input), where $\text{Amp}_{fn}( \ )$ is the amplitude value (e.g., a peak amplitude) at the first frequency 318 ("f1") for the selected model or input spectrum. Alternatively, the first similarity metric may be set to a difference between the second amplitude value 314 and the fifth amplitude value 334, a difference between the third amplitude value 316 and the sixth amplitude value 336, a sum of the differences, an average of the differences, or the like. As illustrative examples, the first similarity metric may be calculated based on average[($\text{Amp}_{f1}$(model)−$\text{Amp}_{f1}$(input))+($\text{Amp}_{f2}$(model)−$\text{Amp}_{f2}$(input))+($\text{Amp}_{f3}$(model)−$\text{Amp}_{f3}$(input))] or based on w1*($\text{Amp}_{f1}$(model)−$\text{Amp}_{F1}$(input))+w2*($\text{Amp}_{f2}$(model)−$\text{Amp}_{f2}$(input))+w3*($\text{Amp}_{f3}$(model)−$\text{Amp}_{f3}$(input)), where w1-w3 are weights based on contributions of vibrations at the various frequencies to occurrence of the respective failure mode. Although three amplitude comparisons are described, some implementations may involve more or less than three amplitude comparisons. In this manner, amplitude values at frequencies across the entire measured frequency range (e.g., 0 to f4) may be compared between the predetermined frequency model 310 and the frequency spectrum 330, which may improve accuracy of failure detection based on the comparison, as opposed to determining an amplitude within a narrow frequency window of the frequency spectrum 330.

Additionally, particular amplitude values of the frequency spectrum 330 may be tracked over time. For example, based on the fourth amplitude value 332 being located at a particular frequency (e.g., the first frequency 318) that is associated with an amplitude peak of the predetermined frequency model 310, the fourth amplitude value 332 may be tracked over time. Tracking the fourth amplitude value 332 over time may include tracking the fourth amplitude value 332 as it shifts in frequency, as the amplitude value increases or decreases, or the like. Tracking the fourth amplitude value 332 over time may indicate whether a maintenance action causes the machine to transition out of the failure mode, whether a severity of the failure mode increases, or other useful information.

Figure 4:
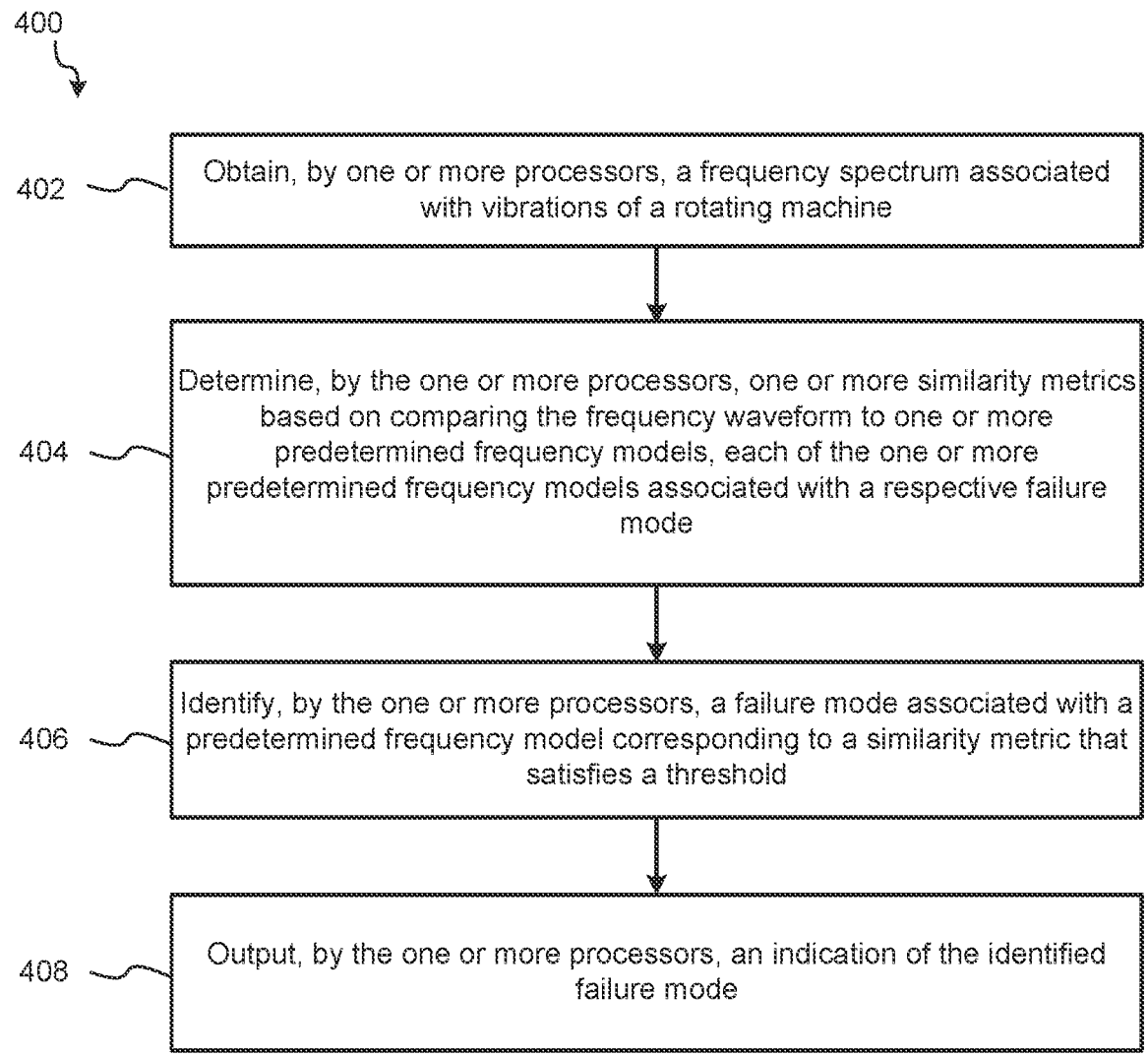
FIG. 4 is a flow diagram illustrating an example of a method for detecting failure modes of machinery according to one or more aspects.

Referring to FIG. 4, a flow diagram of an example of a method for detecting failure modes of machinery according to one or more aspects is shown as a method 400. In some implementations, the operations of the method 400 may be stored as instructions that, when executed by one or more processors (e.g., the one or more processors of a monitoring device or a server), cause the one or more processors to perform the operations of the method 400. In some implementations, the method 400 may be performed by a computing device, such as the computing device 102 of FIG. 1 (e.g., a computing device for detecting failure modes of a rotating machine).

The method 400 includes obtaining a frequency spectrum associated with vibrations of a rotating machine, at 402. For example, the one or more processors 104 of FIG. 1 may generate a frequency spectrum based on the vibration data 150 of FIG. 1 (or the frequency spectrum may be received from an external source), and the rotating machine may include or correspond to the machine 130 of FIG. 1.

The method 400 includes determining one or more similarity metrics based on comparing the frequency spectrum to one or more predetermined frequency models, each of the one or more predetermined frequency models associated with a respective failure mode, at 404. For example, the one or more similarity metrics may include or correspond to the similarity metrics 110 of FIG. 1 and the one or more predetermined frequency models may include or correspond to the predetermined frequency models 112 of FIG. 1. The method 400 includes identifying a failure mode associated with a predetermined frequency model corresponding to a similarity metric that satisfies a threshold, at 406. For example, the failure mode may include or correspond to the identified failure mode 114 of FIG. 1, the predetermined frequency model may include or correspond to one of the predetermined frequency models 112 of FIG. 1, and the similarity metric may include or correspond to one of the similarity metrics 110 of FIG. 1. The method 40( )further includes outputting an indication of the identified failure mode, at 408. For example, the indication may include or correspond to the output 152 of FIG. 1.

In some implementations, determining a first metric of the one or more similarity metrics may include comparing the frequency spectrum to a first predetermined frequency model over an entirety of a measured frequency range associated with the first predetermined frequency model. For example, the frequency spectrum 330 may be compared to the predetermined frequency model 310 over an entire measured frequency range of the predetermined frequency model 310, as further described with reference to FIG. 3. In some such implementations, determining the first similarity metric may include determining the first similarity metric based on a difference between one or more frequency-specific amplitude values indicated by the first predetermined frequency model and one or more corresponding frequency-specific amplitude values indicated by the frequency spectrum. For example, a first similarity metric may be based at least on a difference between a first amplitude value 312. of the predetermined frequency model 310 at a first frequency 318 and a fourth amplitude value 332 of the frequency spectrum 330 at the first frequency 318.

In some implementations, outputting the indication of the identified failure mode may include outputting an alert that indicates the identified failure mode and an identifier of the rotating machine. For example, the alert may include or correspond to the alert or command 154 of FIG. 1. Additionally or alternatively, outputting the indication of the identified failure mode may include initiating display of a graphic user interface (GUI) that includes the identified failure mode, the frequency spectrum, a vibration waveform corresponding to the frequency spectrum, the predetermined frequency model corresponding to the similarity metric that satisfies the threshold, the similarity metric that satisfies the threshold, or a combination thereof. For example, the output 152 may be provided to the display device 136 of FIG. 1 to enable display of a GUI at the display device 136.

In some implementations, outputting the indication of the identified failure mode may include initiating performance of a maintenance action associated with mitigating the identified failure mode. For example, the alert or command 154 of FIG. 1 (e.g., a command) may be provided to the machine controller 134 to cause execution of the maintenance action. Additionally or alternatively, the method 400 may further include tracking a particular amplitude peak of the frequency spectrum over time based on the particular amplitude peak corresponding to an amplitude peak indicated by at least one of the one or more predetermined frequency models. For example, the fourth amplitude value 332. of the frequency spectrum 330 of FIG. 3 may be tracked over time based on the fourth amplitude value 332 being located at the frequency at which an amplitude peak of the predetermined frequency model 310 is located.

In some implementations, the method 400 may further include modifying the one or more predetermined frequency models based on one or more measurements associated with the rotational machine. For example, the one or more measurements associated with the rotational machine may include or correspond to the measurement data 116 of FIG. 1. Additionally or alternatively, the method 400 may further include selecting the one or more predetermined frequency models from a plurality of predetermined frequency models associated with a plurality of rotational machines. For example, the predetermined frequency models 112 of FIG. 1 may be selected from multiple predetermined frequency models (e.g., stored at the memory 106 or accessible to the computing device 102) associated with multiple machines.

In some implementations, the failure modes associated with the one or more predetermined frequency models may include an unbalanced condition, a misalignment, a rolling element bearing fault, looseness, stator eccentricity, rotor eccentricity, broken rotor bars, oil whirl in journal bearings, a hydraulic fault, an aerodynamic fault, a surge, or a combination thereof, as described with reference to FIG. 1. Additionally or alternatively, the rotating machine may include a motor, a pump, a gearbox, or an engine, as described with reference to FIG. 1.

In some implementations, obtaining the frequency spectrum includes receiving vibration data from one or more sensors configured to measure the vibrations of the rotating machine and generating the frequency spectrum based on the vibration data, For example, the vibration data may include or correspond to the vibration data 150 of FIG. 1, and the one or more sensors may include or correspond to the sensor 132 of FIG. 1. In some such implementations, the one or more sensors may include an accelerometer coupled to the rotating machine. For example, the accelerometer may include or correspond to the sensor 132 of FIG. 1. Additionally or alternatively, generating the frequency spectrum may include averaging the vibration data in. the time domain, performing a fast Fourier transform (FFT) on the vibration data to convert the vibration data from the time domain to the frequency domain, performing spectrum averaging on the frequency spectrum, or a combination thereof. For example, the vibration analysis engine 121 of FIG. 1 may perform the FFT on the vibration data 150 and the spectrum averaging on the frequency-converted vibration data. In some other implementations, obtaining the frequency spectrum may include receiving the frequency spectrum (e.g., from an external source).

As described above, the method 400 supports automated failure mode detection for rotating machines using vibration analysis. The method 400 may enable failure mode detection with improved accuracy as compared to conventional, mostly human-based failure detection techniques. For example, the method 400 may detect a failure mode by comparing a frequency spectrum based on vibration data to predetermined frequency models, which may better discriminate between vibrations that are associated with a failure mode than conventional techniques using peak detection and narrow frequency window analysis.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 may be performed in any order, or that operations of one method may be performed during performance of another method. It is also noted that the method 400 of FIG. 4 may also include other functionality or operations consistent with the description of the operations of the system 100 of FIG. 1 or the system 200 of FIG. 2, Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for detecting failure modes of machinery, the method comprising:
    obtaining, by one or more processors, a frequency spectrum associated with vibrations of a rotating machine, wherein obtaining the frequency spectrum comprises:
        receiving vibration data from one or more sensors configured to measure the vibrations of the rotating machine; and
        generating the frequency spectrum based on the vibration data, wherein generating the frequency spectrum includes performing spectrum averaging on the frequency spectrum;
    modifying, by the one or more processors, one or more predetermined frequency models based on measurement data associated with the rotating machine;
    determining, by the one or more processors, one or more similarity metrics based on comparing the frequency spectrum to the one or more modified predetermined frequency models, each of the one or more modified predetermined frequency models associated with a respective failure mode;
    identifying, by the one or more processors, a failure mode associated with a predetermined frequency model corresponding to a similarity metric that satisfies a threshold; and
    outputting, by the one or more processors, an indication of the identified failure mode.

2. The method of claim 1, wherein determining a first similarity metric of the one or more similarity metrics comprises comparing, by the one or more processors, the frequency spectrum to a first modified predetermined frequency model over an entirety of a measured frequency range associated with the first modified predetermined frequency model.

3. The method of claim 2, wherein determining the first similarity metric further comprises determining, by the one or more processors, the first similarity metric based on a difference between one or more frequency-specific amplitude values indicated by the first modified predetermined frequency model and one or more corresponding frequency-specific amplitude values indicated by the frequency spectrum.

4. The method of claim 1, wherein outputting the indication of the identified failure mode comprises outputting, by the one or more processors, an alert that indicates the identified failure mode and an identifier of the rotating machine.

5. The method of claim 1, wherein outputting the indication of the identified failure mode comprises initiating, by the one or more processors, display of a graphic user interface (GUI) that includes the identified failure mode, the frequency spectrum, a vibration waveform corresponding to the frequency spectrum, the predetermined frequency model corresponding to the similarity metric that satisfies the threshold, the similarity metric that satisfies the threshold, or a combination thereof.

6. The method of claim 1, wherein outputting the indication of the identified failure mode comprises initiating, by the one or more processors, performance of a maintenance action associated with mitigating the identified failure mode.

7. The method of claim 1, wherein obtaining the frequency spectrum comprises:
receiving, by the one or more processors, vibration data from one or more sensors configured to measure the vibrations of the rotating machine; and
generating, by the one or more processors, the frequency spectrum based on the vibration data.

8. The method of claim 7, wherein the one or more sensors comprise an accelerometer coupled to the rotating machine.

9. The method of claim 1, wherein obtaining the frequency spectrum comprises receiving, by the one or more processors, the frequency spectrum.

10. The method of claim 1, wherein the rotating machine comprises a motor, a pump, a gearbox, or an engine.

11. A device for detecting failure modes of machinery, the device comprising:
a memory; and
one or more processors communicatively coupled to the memory, the one or more processors configured to:
obtain a frequency spectrum associated with vibrations of a rotating machine, wherein obtaining the frequency spectrum comprises:
receiving vibration data from one or more sensors configured to measure the vibrations of the rotating machine; and
generating the frequency spectrum based on the vibration data, wherein generating the frequency spectrum includes performing spectrum averaging on the frequency spectrum;
modify one or more predetermined frequency models based on measurement data associated with the rotating machine;
determine one or more similarity metrics based on comparing the frequency spectrum to the one or more modified predetermined frequency models, each of the one or more modified predetermined frequency models associated with a respective failure mode;
identify a failure mode associated with a predetermined frequency model corresponding to a similarity metric that satisfies a threshold; and
output an indication of the identified failure mode.

12. The device of claim 11, further comprising an interface configured to enable communication with one or more sensors configured to measure the vibrations of the rotating machine, a data source configured to store the one or more predetermined frequency models, or a combination thereof, and wherein the measurement data indicates rotation speed, shaft diameter, bearing diameter, number of bearings, size of tracks, environmental noise, or a combination thereof.

13. The device of claim 11, wherein the one or more processors are configured to modify the one or more predetermined frequency models by modifying one or more amplitudes, sniffing particular frequencies, or flattening or narrowing one or more curves, based on the measurement data.

14. The device of claim 11, further comprising a display device configured to display a graphic user interface (GUI) that includes the identified failure mode, the frequency spectrum, a vibration waveform corresponding to the frequency spectrum, the predetermined frequency model corresponding to the similarity metric that satisfies the threshold, the similarity metric that satisfies the threshold, or a combination thereof.

15. A non-transitory computer-readable storage medium storing instructions that, when executed by one or more processors, cause the one or more processors to perform operations for detecting failure modes of machinery, the operations comprising:
obtaining a frequency spectrum associated with vibrations of a rotating machine, wherein obtaining the frequency spectrum comprises:
receiving vibration data from one or more sensors configured to measure the vibrations of the rotating machine; and
generating the frequency spectrum based on the vibration data, wherein generating the frequency spectrum includes performing spectrum averaging on the frequency spectrum;
selecting one or more predetermined frequency models from a plurality of predetermined frequency models based on one or more characteristics of the rotating machine;
determining one or more similarity metrics based on comparing the frequency spectrum to the one or more predetermined frequency models, each of the one or more predetermined frequency models associated with a respective failure mode;
identifying a failure mode associated with a predetermined frequency model corresponding to a similarity metric that satisfies a threshold; and
outputting an indication of the identified failure mode.

16. The non-transitory computer-readable storage medium of claim 11, wherein determining a first similarity metric of the one or more similarity metrics comprises comparing the frequency spectrum to a first predetermined frequency model over an entirety of a measured frequency range associated with the first predetermined frequency model.

17. The non-transitory computer-readable storage medium of claim 15, wherein the plurality of predetermined frequency models include multiple groups of frequency models, each group of the multiple groups of frequency models corresponding to a respective machine type.

18. The non-transitory computer-readable storage medium of claim 15, wherein the operations further comprise further comprising tracking a particular amplitude peak of the frequency spectrum over time based on the particular amplitude peak corresponding to an amplitude peak indicated by a first predetermined frequency models of the one of the one or more predetermined frequency models that is associated with a precursor state to the failure mode.

\* \* \* \* \*